(12) United States Patent
Oh et al.

(10) Patent No.: US 9,047,910 B2
(45) Date of Patent: Jun. 2, 2015

(54) SPINDLE MOTOR AND HARD DISK DRIVE INCLUDING THE SAME

(71) Applicant: SAMSUNG ELECTRO-MECHANICS CO., LTD., Suwon-si (KR)

(72) Inventors: Song Bon Oh, Suwon-si (KR); Shin Young Cheong, Suwon-si (KR); Kum Kyung Lee, Suwon-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 14/169,116

(22) Filed: Jan. 30, 2014

(65) Prior Publication Data

US 2015/0092299 A1    Apr. 2, 2015

(30) Foreign Application Priority Data

Oct. 2, 2013  (KR) ........................ 10-2013-0117819

(51) Int. Cl.
*H02K 7/08* (2006.01)
*G11B 19/20* (2006.01)

(52) U.S. Cl.
CPC .............. *G11B 19/2009* (2013.01); *H02K 7/08* (2013.01)

(58) Field of Classification Search
CPC . G11B 19/2036; H02K 5/165; H02K 5/1677; H02K 7/086; F16C 33/745; F16C 33/107; F16C 17/107
USPC ........................................ 360/99.08; 310/90
See application file for complete search history.

(56) References Cited

U.S. PATENT DOCUMENTS

| 6,316,857 | B1 | 11/2001 | Jeong | |
| 8,836,182 | B2* | 9/2014 | Nishikata et al. | 310/67 R |
| 8,873,198 | B1* | 10/2014 | Iwasaki et al. | 360/99.08 |
| 2001/0007519 | A1* | 7/2001 | Nishio et al. | 360/99.08 |
| 2004/0114840 | A1* | 6/2004 | Gomyo | 384/107 |
| 2006/0043808 | A1 | 3/2006 | Son et al. | |

(Continued)

FOREIGN PATENT DOCUMENTS

| JP | 2009-8200 A | 1/2009 |
| KR | 10-2001-0091672 | 10/2001 |

(Continued)

OTHER PUBLICATIONS

Office Action dated Sep. 24, 2014 for Korean Patent Application No. 10-2013-0117819 and its English summary provided by Applicant's foreign counsel.

*Primary Examiner* — Angel Castro
(74) *Attorney, Agent, or Firm* — Ladas & Parry, LLP (57) ABSTRACT

There are provided a spindle motor including a lower thrust member fixed to a base member; and a shaft fixed to the lower thrust member, wherein the lower thrust member includes a fitting protrusion protruding upwardly in the axial direction and fitted into a fixing groove formed in a lower end of the shaft so as to be depressed upwardly in the axial direction, a thrust bearing surface forming a thrust bearing between the thrust bearing surface and a lower surface of the sleeve, and an extension part protruding from an outer edge of the lower thrust member in a radial direction upwardly in the axial direction to form a liquid-vapor interface between the extension part and an outer surface of the sleeve while enclosing the sleeve, and the thrust bearing surface has inner and outer concave parts depressed in one of inner and outer diameter directions thereof, respectively.

18 Claims, 8 Drawing Sheets

(56) References Cited

U.S. PATENT DOCUMENTS

2006/0147135 A1    7/2006  Kim
2010/0226601 A1*   9/2010  Inazuka et al. ................ 384/107
2014/0118859 A1*   5/2014  Yun et al. ................... 360/99.12

FOREIGN PATENT DOCUMENTS

| KR | 10-2006-0020932   | 3/2006 |
| KR | 10-2006-0079630 A | 7/2006 |
| KR | 10-2006-0086614   | 8/2006 |

* cited by examiner

SPINDLE MOTOR AND HARD DISK DRIVE INCLUDING THE SAME

CROSS-REFERENCE TO RELATED APPLICATION

This application claims the benefit of Korean Patent Application No. 10-2013-0117819 filed on Oct. 2, 2013, with the Korean Intellectual Property Office, the disclosure of which is incorporated in its entirety herein by reference.

BACKGROUND

The present disclosure relates to a spindle motor and a hard disk drive (HDD) including the same.

In an information recording and reproducing device such as a HDD for a server, or the like, a fixed shaft-type spindle motor in which a shaft having excellent vibration characteristics is fixed to a case of the hard disk drive is commonly used.

That is, in such a fixed shaft-type spindle motor, the shaft is fixedly installed in the spindle motor mounted in the hard disk drive for a server, in order to prevent a disk from being damaged and not allowing information to be recorded thereon or for information recorded thereon from being read, due to a rotor having a large amplitude, caused by external vibrations.

As described above, in the case in which the fixed-type shaft is installed, thrust members are fixedly installed on upper and lower portions of the shaft.

However, in the case in which the shaft is fixed to the lower thrust member and the lower thrust member is fixed to a base, since the shaft serving as a rotational axis should be firmly fixed in place, a thickness of the lower thrust member is increased and the lower thrust member having the increased thickness is fixed to an outer peripheral surface of the shaft by a method such as a press-fitting method, a bonding method, a sliding coupling method, or the like. Alternatively, the lower thrust member and the shaft are formed integrally with each other.

Particularly, since the lower thrust member has a cup shape which includes a disk part and an extension part protruding from the disk part in an axial direction, it may be difficult to process the lower thrust member so that the disk part and the extension part form an accurate right angle with respect to each other at a boundary portion therebetween. Therefore, contact between a sleeve and the boundary portion between the disk part and the extension part may be generated. Accordingly, a thrust bearing to be formed between the sleeve and the disk part may not be appropriately operated.

Further, the lower thrust member may include a fitting protrusion formed in a central portion thereof and protruding upwardly in the axial direction so as to be coupled to the shaft. In this case, it is also difficult to process the lower thrust member so that the disk part and the fitting protrusion accurately form a right angle with respect to each other at a boundary portion therebetween. Therefore, the shaft may not be completely fitted into the fitting protrusion, thereby hindering thinning of the spindle motor.

As described above, in the spindle motor according to the related art, the thinning of the spindle motor is hindered by a structure of the lower thrust member, a bearing span distance can is inevitably decreased, and the thrust bearing may not be appropriately operated, such that performance of the spindle motor may be impaired.

RELATED ART DOCUMENT (Patent Document 1) Korean Patent Laid-Open Publication No. 2006-0079630

SUMMARY

An aspect of the present disclosure may provide a fixed shaft-type spindle motor capable of being reduced in thickness by improving accuracy in coupling between a lower thrust member and a member to be coupled through a simple alteration of a structure of the lower thrust member.

An aspect of the present disclosure may also provide a fixed shaft-type spindle motor having improved operational performance by including a lower thrust member that may be accurately coupled to a shaft to decrease the overall thickness of the spindle motor and increase a bearing span distance.

An aspect of the present disclosure may also provide a fixed shaft-type spindle motor in which a thrust bearing may be accurately formed.

According to an aspect of the present disclosure, a spindle motor may include: a lower thrust member fixed to a base member; a shaft fixed to the lower thrust member; a sleeve disposed above the lower thrust member and installed so as to be rotatable with respect to the shaft; and a rotor hub coupled to the sleeve to be rotated together therewith, wherein the lower thrust member includes a fitting protrusion protruding upwardly in the axial direction and fitted into a fixing groove formed in a lower end of the shaft so as to be depressed upwardly in the axial direction, a thrust bearing surface forming a thrust bearing between the thrust bearing surface and a lower surface of the sleeve, and an extension part protruding from an outer edge of the lower thrust member in a radial direction upwardly in the axial direction to form a liquid-vapor interface between the extension part and an outer surface of the sleeve while enclosing the sleeve, and the thrust bearing surface has inner and outer concave parts depressed in one of inner and outer diameter directions thereof, respectively.

The inner concave part may be formed at a boundary at which the fitting protrusion protrudes from the lower thrust member.

The inner concave part may be formed in the lower thrust member so as to be depressed downwardly in the axial direction.

The inner concave part may be formed in the fitting protrusion so as to be depressed in the inner diameter direction.

The outer concave part may be formed at a boundary at which the extension part protrudes from the lower thrust member.

The outer concave part may be formed in the lower thrust member so as to be depressed downwardly in the axial direction.

The outer concave part may be formed in the extension part so as to be depressed in the outer diameter direction.

The thrust bearing surface, the inner concave part, and the outer concave part may be formed continuously in a circumferential direction.

According to another aspect of the present disclosure, a spindle motor may include: a lower thrust member fixed to a base member; a shaft disposed in the lower thrust member; a sleeve disposed above the lower thrust member and installed so as to be rotatable with respect to the shaft; and a rotor hub coupled to the sleeve to be rotated together therewith, wherein the lower thrust member is formed integrally with the shaft and includes a thrust bearing surface forming a thrust bearing between the thrust bearing surface and a lower surface of the sleeve and an extension part protruding from an outer edge of the lower thrust member in a radial direction upwardly in the axial direction to form a liquid-vapor interface between the extension part and an outer surface of the sleeve while enclosing the sleeve, and the thrust bearing surface has inner and outer concave parts depressed in one of inner and outer diameter directions thereof, respectively.

The inner concave part may be formed at a boundary at which the shaft protrudes from the lower thrust member.

The inner concave part may be formed in the lower thrust member so as to be depressed downwardly in the axial direction.

The inner concave part may be formed in the shaft so as to be depressed in the inner diameter direction.

The outer concave part may be formed at a boundary at which the extension part protrudes from the lower thrust member.

The outer concave part may be formed in the lower thrust member so as to be depressed downwardly in the axial direction.

The outer concave part may be formed in the extension part so as to be depressed in the outer diameter direction.

The thrust bearing surface, the inner concave part, and the outer concave part may be formed continuously in a circumferential direction.

According to another aspect of the present disclosure, a hard disk drive may include: the spindle motor as described above rotating a disk by power applied thereto through a substrate; a magnetic head writing data to and reading data from data from the disk; and a head transfer part moving the magnetic head to a predetermined position above the disk.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

Figure 1:
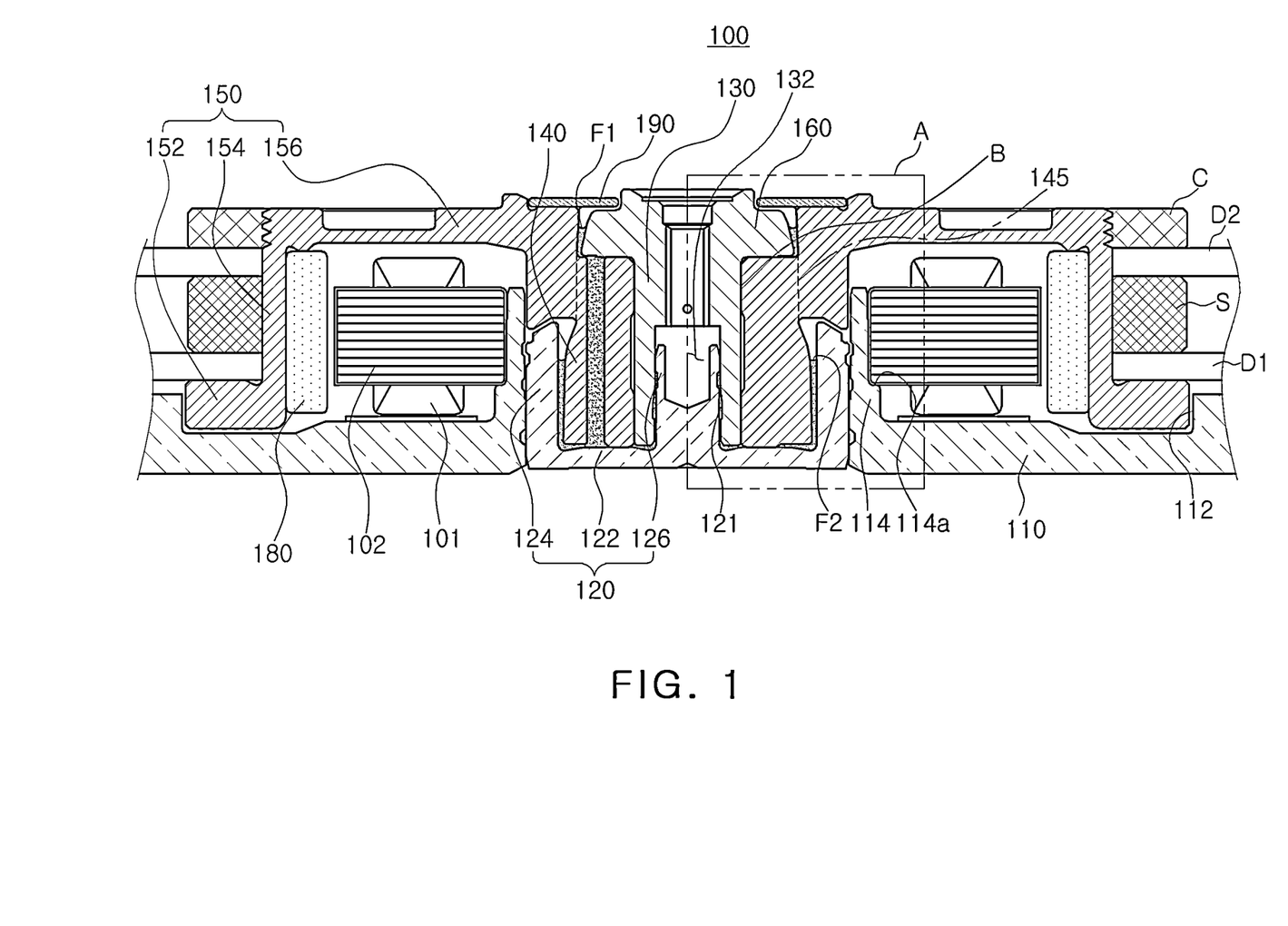
FIG. 1 is a schematic cross-sectional view showing a spindle motor according to an exemplary embodiment of the present disclosure.
Figure 2:
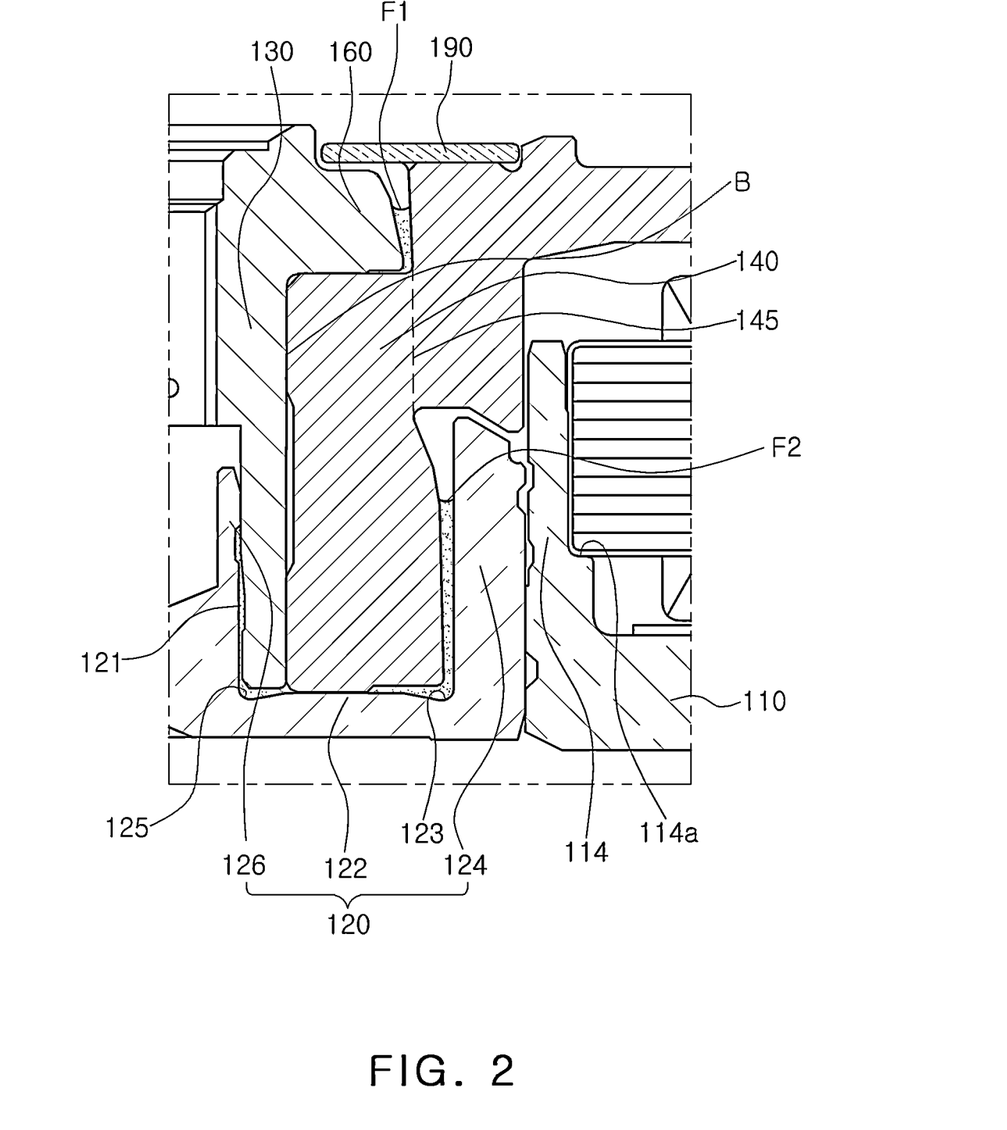
FIG. 2 is an enlarged view of part A of FIG. 1.
Figure 3:
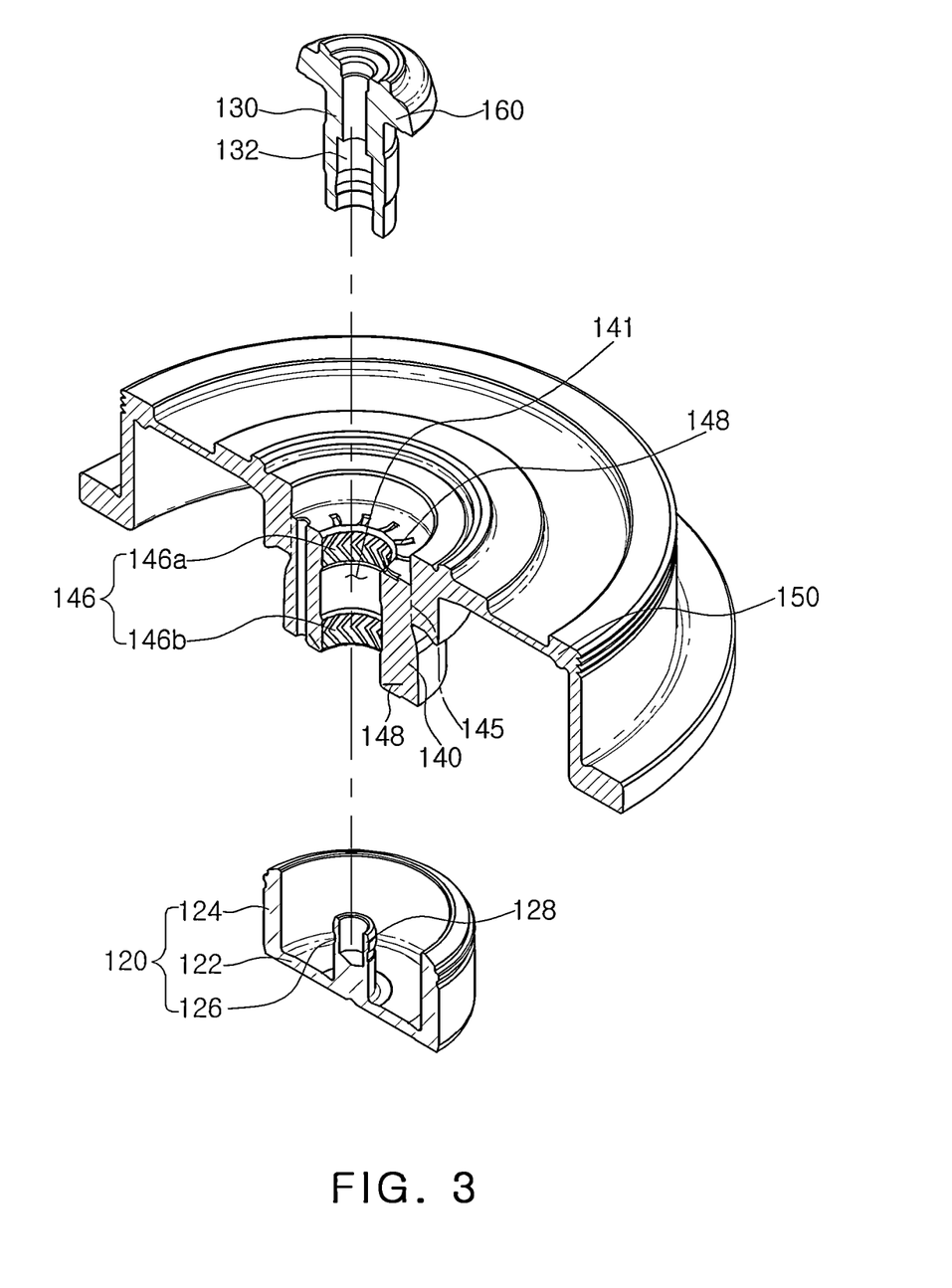
FIG. 3 is a partially cut-away exploded perspective view showing a shaft, a sleeve, and upper and lower thrust members according to an exemplary embodiment of the present disclosure.
Figure 4:
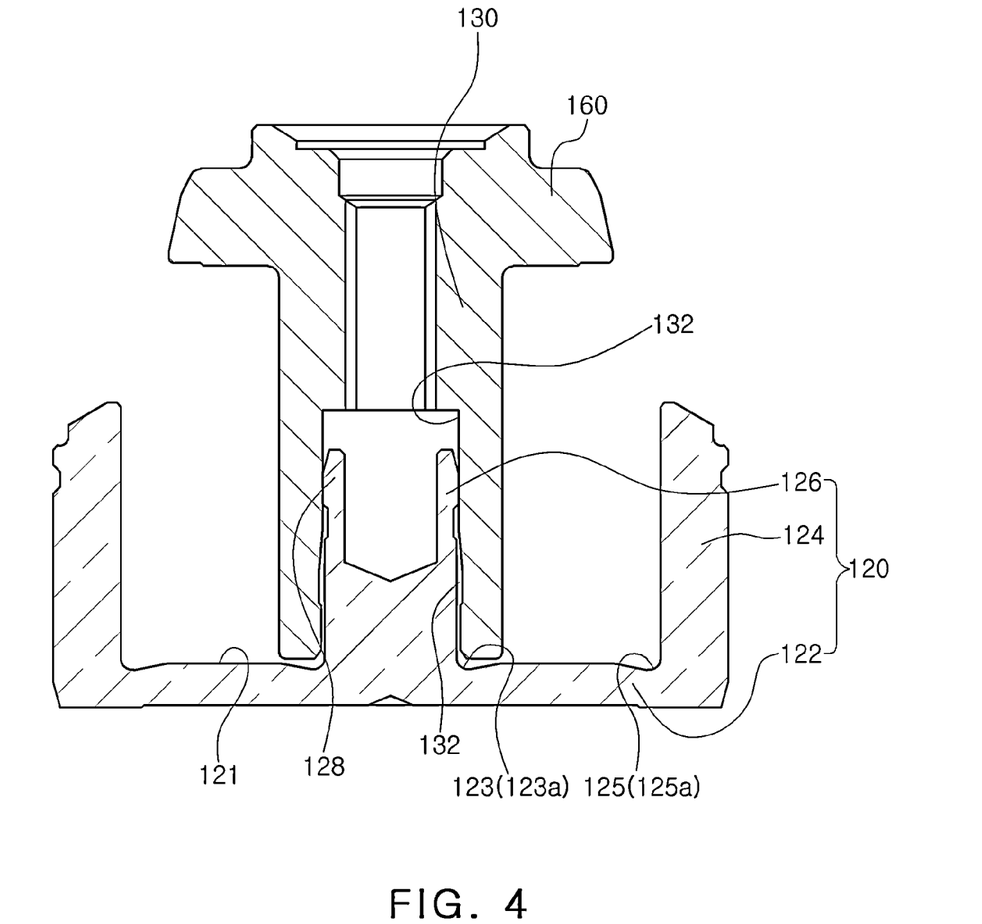
FIGS. 4 and 5 are cross-sectional views showing a coupling structure between a shaft and upper and lower thrust members of the spindle motor according to an exemplary embodiment of the present disclosure and inner and outer concave parts provided in the coupling structure.
Figure 5:
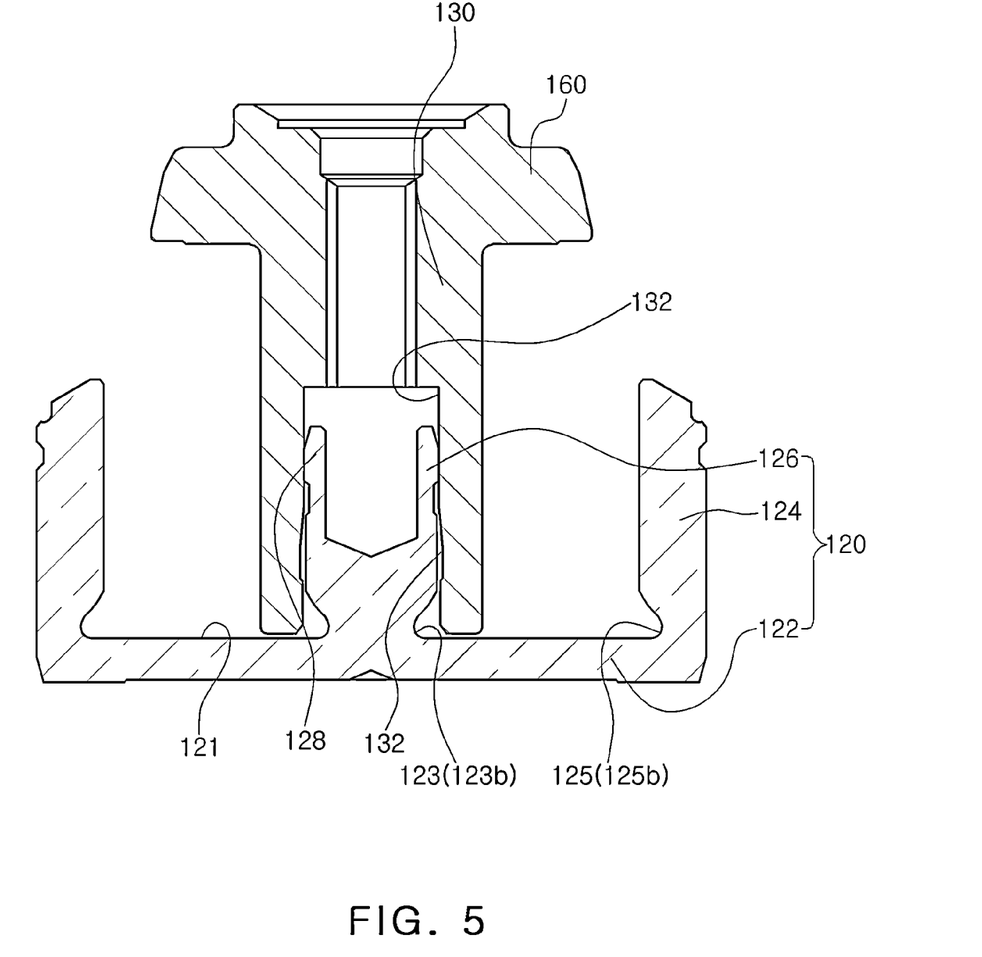

FIG. 1 is a schematic cross-sectional view showing a spindle motor according to an exemplary embodiment of the present disclosure; FIG. 2 is an enlarged view of part A of FIG. 1; FIG. 3 is a partially cut-away exploded perspective view showing a shaft, a sleeve, and upper and lower thrust members according to an exemplary embodiment of the present disclosure; and FIGS. 4 and 5 are cross-sectional views showing a coupling structure between a shaft and upper and lower thrust members of the spindle motor according to an exemplary embodiment of the present disclosure and inner and outer concave parts provided in the coupling structure.

Referring to FIGS. 1 through 5, a spindle motor 100 according to an exemplary embodiment of the present disclosure may include a base member 110, a lower thrust member 120, a shaft 130, a sleeve 140, a rotor hub 150, and an upper thrust member 160. In addition, the spindle motor 100 according to an exemplary embodiment of the present disclosure may further include a cap member 190 mounted on the rotor hub 150 so as to complete an upper sealing part.

Here, terms with respect to directions will be first defined. As viewed in FIG. 1, an axial direction refers to a vertical direction, that is, a direction from a lower portion of the shaft 130 toward an upper portion thereof or a direction from the upper portion of the shaft 130 toward the lower portion thereof, a radial direction refers to a horizontal direction, that is, a direction from the shaft 130 toward an outer peripheral surface of the rotor hub 150 or from the outer peripheral surface of the rotor hub 150 toward the shaft 130, and a circumferential direction refers to a rotation direction along a predetermined radius from the center of rotation.

In addition, the lower thrust member 120 may be included, together with the base member 110, in a fixed member, that is, a stator.

The base member 110 may include a mounting groove 112 formed therein so as to form a predetermined space together with the rotor hub 150. In addition, the base member 110 may have a coupling part 114 extended upwardly in the axial direction and having a stator core 102 installed on an outer peripheral surface thereof.

In addition, the coupling part 114 may have a seating surface 114a provided on the outer peripheral surface thereof so that the stator core 102 may be seated and installed thereon. Further, the stator core 102 seated on the coupling part 114 may be disposed above the mounting groove 112 of the base member 110 described above.

Here, the base member 110 may be manufactured by die-casting an aluminum (Al) material or may be manufactured by performing plastic working (for example, press working) on a steel sheet.

The lower thrust member 120 may be fixed to the base member 110. That is, the lower thrust member 120 may be inserted into the coupling part 114. More specifically, the lower thrust member 120 may be installed so that an outer peripheral surface thereof is bonded to an inner peripheral surface of the coupling part 114.

Meanwhile, the lower thrust member 120 may include a disk part 122, an extension part 124 extended from an outer edge of the disk part 122 upwardly in the axial direction and having an outer surface fixed to the base member 110, and a fitting protrusion 126 protruding from the center of the disk part 122 upwardly in the axial direction and fitted into a fixing groove 132 formed in a lower end of a shaft 130 to be described below.

That is, the lower thrust member 120 may have a cup shape in which it has a hollow and includes a protrusion formed at the center of the hollow. In other words, the lower thrust member 120 may have an 'E' shaped cross section.

Here, the fitting protrusion 126 of the lower thrust member 120 may have a communication hole (not shown) formed therein so as to penetrate therethrough in the axial direction. The communication hole (not shown) may naturally discharge air present in the fixing groove 132 therethrough in a process of fitting the fitting protrusion 126 into the fixing groove 132, thereby improving coupling strength between the fitting protrusion 126 and the fixing groove 132.

Meanwhile, the lower thrust member 120 according to an exemplary embodiment of the present disclosure may have a thrust bearing surface 121 positioned on an upper surface of the disk part 122 and forming a thrust bearing between the thrust bearing surface 121 and a lower surface of the sleeve 140. In addition, the thrust bearing surface may have inner and outer concave parts 123 and 125 depressed in one of inner and outer diameter directions thereof, respectively.

The inner concave part 123 may be formed at a boundary at which the fitting protrusion 126 protrudes from the lower thrust member 120, more specifically, the disk part 122. More specifically, as shown in FIG. 4, the inner concave part 123*a* may be formed in the lower thrust member 120, more specifically, the disk part 122, so as to be depressed downwardly in the axial direction. In addition, as shown in FIG. 5, the inner concave part 123*b* may also be formed in the fitting protrusion 126 so as to be depressed in the inner diameter direction.

In addition, the outer concave part 125 may be formed at a boundary at which the extension part 124 protrudes from the lower thrust member 120, more specifically, the disk part 122. More specifically, as shown in FIG. 4, the outer concave part 125*a* may be formed in the lower thrust member 120, more specifically, the disk part 122, so as to be depressed downwardly in the axial direction. In addition, as shown in FIG. 5, the outer concave part 125*b* may also be formed in the extension part 124 so as to be depressed in the outer diameter direction.

The spindle motor 100 according to an exemplary embodiment of the present disclosure may include the inner and outer concave parts 123 and 125, whereby boundary portions between the disk part 122 and the fitting protrusion 126 and between the disk part 122 and the extension part 124 may be depressed at the time of processing the lower thrust member 120.

Therefore, in the case in which the fitting protrusion 126 is fitted into the fixing groove 132 of the shaft 130, since a protruding round part that may be formed at a boundary between the disk part 122 and the fitting protrusion 126 is not basically formed at the boundary, the fitting protrusion 126 may be completely fitted into the fixing groove 132. Therefore, the spindle motor may be thinned and an axial distance may be sufficiently secured to increase bearing rigidity.

In addition, since a round protruding part that may be formed at a boundary portion between the disk part 122 and the extension part 124 is not formed at the boundary portion, friction against the sleeve 140 fitted and rotated in a space formed by the disk part 122 and the extension part 124 may not be generated. In addition, unnecessary separation between the upper surface of the disk part 122, that is, the thrust bearing surface 121 and the lower surface of the sleeve 140 due to the protruding round part may be not generated, such that a very efficient thrust bearing may be formed.

Meanwhile, the thrust bearing surface 121, the inner concave part 123, and the outer concave part 125 may be formed continuously in a circumferential direction. In this case, the lower thrust member 120 may easily exhibit performance thereof.

The shaft 130 may be fixed to the lower thrust member 120. That is, the fitting protrusion 126 included in the lower thrust member 120 may be fitted into the fixing groove 132 formed in the lower end surface of the shaft 130, such that the shaft 130 may be firmly fixed to the lower thrust member 120. That is, the lower end surface of the shaft 130 in the axial direction may be provided with the fixing groove 132 depressed upwardly in the axial direction, and the fitting protrusion 126 of the lower thrust member 120 may be fitted into the fixing groove 132. As a coupling method, various coupling methods such as an adhesive bonding method, a sliding-fitting method, a screw coupling method, a press-fitting method, and the like, may be used.

Although the case in which the shaft 130 is fixed to the lower thrust member 120 has been described by way of example in an exemplary embodiment of the present disclosure, the present disclosure is not limited thereto. For example, in the case in which the lower thrust member 120 is formed integrally with the base member 110, the shaft 130 may also be fixed to the base member 110.

Meanwhile, the shaft 130 may be also included, together with the lower thrust member 120 and the base member 110, in the fixed member, that is, the stator.

An upper surface of the shaft 130 may be provided with a coupling unit, for example, a screw receiving portion having a screw screwed thereinto, so that a cover member (not shown) may be fixed thereto.

In the case in which the fitting protrusion 126 having nothing on an outer surface thereof is fitted into the fixing groove 132, the fitting protrusion 126 may be coupled to the fixing groove 132 in a sliding scheme, but may not be easily coupled to the fixing groove 132 in a press-fitting scheme. The reason may be that very large amount of force may be required in order to perform press-fitting in a state in which surfaces of rigid bodies contact each other or members to be coupled to each other may be deformed in a press-fitting process.

Therefore, in an exemplary embodiment of the present disclosure, the fitting protrusion 126 may have a pressing protrusion 128 formed on an outer peripheral surface thereof (See FIGS. 4 and 5). The pressing protrusion 128 may have a shape in which it protrudes from the outer peripheral surface of the fitting protrusion 126 in the outer diameter direction. In the case in which the pressing protrusion 128 is provided on the outer peripheral surface of the fitting protrusion 126, since only the pressing protrusion 128 contacts an inner peripheral surface of the fixing groove 132, a contact area may be reduced, such that the fitting protrusion 126 may be coupled to the fixing groove 132 in the press-fitting scheme. Further, even in the case in which the pressing protrusion 128 is provided on the outer peripheral surface of the fitting protrusion 126, an adhesive may also be provided between the fixing groove 132 of the shaft 130 and the fitting protrusion 126.

The sleeve 140 may be installed so as to be rotatable with respect to the shaft 130. To this end, the sleeve 140 may include a through-hole 141 into which the shaft 130 is inserted. Meanwhile, in the case in which the sleeve 140 is installed so as to be rotatable with respect to the shaft 130, an inner peripheral surface of the sleeve 140 and an outer peripheral surface of the shaft 130 may be disposed so as to be spaced apart from each other by a predetermined interval to form a bearing clearance B therebetween. In addition, the bearing clearance B may be filled with a lubricating fluid.

In addition, the sleeve 140 may have the rotor hub 150 bonded to an outer peripheral surface thereof. That is, the sleeve 140 may have a bonding surface 145 formed on the outer peripheral surface thereof. Here, the sleeve 140 and the rotor hub 150 may be formed integrally with each other. In the case in which the sleeve 140 and the rotor hub 150 are formed integrally with each other, since both of the sleeve 140 and the rotor hub 150 are provided as a single member, the number of motor components may be decreased, whereby a product may be more easily assembled.

Meanwhile, a lower end portion of the outer peripheral surface of the sleeve 140 may be inclined upwardly in the inner diameter direction so as to form a liquid-vapor interface together with the extension part 124 of the lower thrust member 120.

That is, the lower end portion of the sleeve 140 may be inclined upwardly in the inner diameter direction so that a second liquid-vapor interface F2 may be formed in a space between the outer peripheral surface of the sleeve 140 and the extension part 124 of the lower thrust member 120.

As described above, since the second liquid-vapor interface F2 is formed in the space between the lower end portion of the sleeve 140 and the extension part 124, the lubricating fluid provided in the bearing clearance B may form a first liquid-vapor interface F1 to be described below and the second liquid-vapor interface F2.

In addition, the sleeve 140 may have a radial dynamic pressure groove 146 formed in an inner surface thereof in order to generate fluid dynamic pressure through the lubricating fluid filled in the bearing clearance B at the time of being rotated. That is, the radial dynamic pressure groove 146 may include upper and lower radial dynamic pressure grooves 146a and 146b, as shown in FIG. 3.

However, the radial dynamic pressure groove 146 is not limited to being formed in the inner surface of the sleeve 140, but may also be formed in the outer peripheral surface of the shaft 130. In addition, the radial dynamic pressure groove 146 may have various patterns such as a herringbone pattern, a spiral pattern, a helical pattern, and the like.

The rotor hub 150 may be coupled to the sleeve 140 to be rotated together therewith 140.

The rotor hub 150 may include a rotor hub body 152, a mounting part 154 extended from an edge of the rotor hub body 152 and including a magnet 180 mounted on an inner surface thereof, and an extension part 156 extended from an edge of the mounting part 154 in the outer diameter direction.

Meanwhile, a lower end portion of an inner surface of the rotor hub body 152 may be bonded to an outer surface of the sleeve 140. That is, the lower end portion of the inner surface of the rotor hub body 152 and the bonding surface 145 of the sleeve 140 may be coupled to each other in a press-fitting or sliding scheme or be bonded to each other by an adhesive and/or welding.

Therefore, the sleeve 140 may be rotated together with the rotor hub 150 at the time of rotating the rotor hub 150.

In addition, the mounting part 154 may be extended from the rotor hub body 152 in the downward axial direction. Further, the mounting part 154 may have the magnet 180 fixedly installed on the inner surface thereof.

The magnet 180 may have an annular ring shape and be a permanent magnet generating a magnetic field having a predetermined strength by alternately magnetizing an N pole and an S pole in the circumferential direction.

Meanwhile, the magnet 180 may be disposed to face a front end of the stator core 102 having a coil 101 wound therearound and generate driving force capable of rotating the rotor hub 150 through electromagnetic interaction with the stator core 102 having the coil 101 wound therearound.

That is, when power is supplied to the coil 101, driving force capable of rotating the rotor hub 150 may be generated by the electromagnetic interaction between the stator core 102 having the coil 101 wound therearound and the magnet 180 disposed to face the stator core 102, such that the rotor hub 150 may be rotated together with the sleeve 140.

The upper thrust member 160 may be fixed to an upper end portion of the shaft 130 and may have an outer surface forming a liquid-vapor interface F1 together with an inner surface of the rotor hub 150. Therefore, the outer surface of the upper thrust member 160 may be inclined in the outer diameter direction downwardly in the axial direction. Here, the upper thrust member 160 may be formed integrally with the shaft 130.

The upper thrust member 160 may be disposed in a space formed by an upper end portion of the outer peripheral surface of the shaft 130, an upper surface of the sleeve 140, and the inner surface of the rotor hub 150.

In addition, the upper thrust member 160, also a fixed member fixedly installed together with the base member 110, the lower thrust member 120, and the shaft 130, may configure the stator.

Meanwhile, a thrust dynamic groove 148 for generating thrust dynamic pressure may be formed in at least one of a lower surface of the upper thrust member 160 and the upper surface of the sleeve 140 disposed to face the lower surface of the upper thrust member 160.

In addition, the upper thrust member 160 may have the cap member 190 formed thereon so as to prevent the lubricating fluid filled in the bearing clearance B from being leaked upwardly, wherein the cap member 190 may be mounted on the rotor hub 150.

Figure 6:
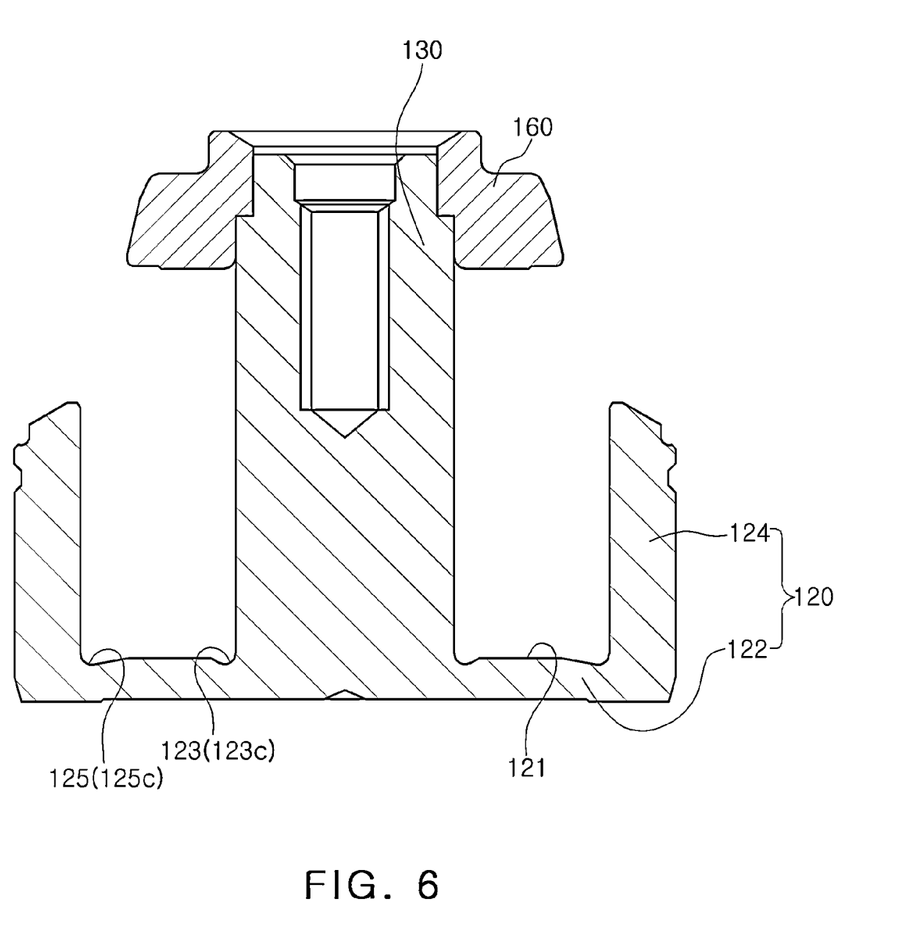
FIGS. 6 and 7 are cross-sectional views showing a coupling structure between a shaft and upper and lower thrust members of the spindle motor according to another exemplary embodiment of the present disclosure and inner and outer concave parts provided in the coupling structure.
Figure 7:
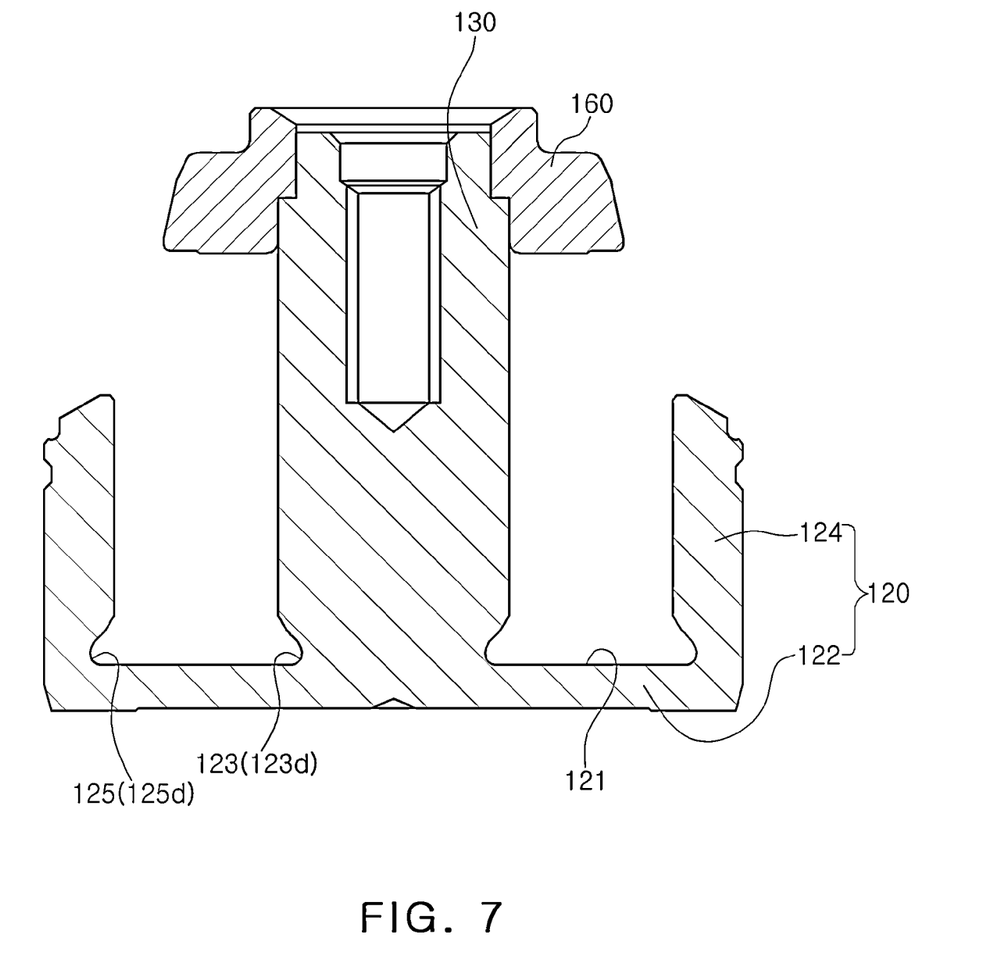

FIGS. 6 and 7 are cross-sectional views showing a coupling structure between a shaft and upper and lower thrust members of the spindle motor according to another exemplary embodiment of the present disclosure and inner and outer concave parts provided in the coupling structure.

Referring to FIGS. 6 and 7, it may be appreciated that a shaft 130 and a lower thrust member 120 are formed integrally with each other in a spindle motor according to another exemplary embodiment of the present disclosure. Features other than the above-mentioned feature are the same as those of the spindle motor 100 described above with reference to FIGS. 1 through 5. Therefore, hereinafter, components structurally different from those of the spindle motor 100 described above with reference to FIGS. 1 through 5 will mainly be described, and the same components as those of the spindle motor 100 described above with reference to FIGS. 1 through 5 will be denoted by the same reference numerals.

A lower thrust member 120 may be fixed to a base member 110. That is, the lower thrust member 120 may be inserted into a coupling part 114. More specifically, the lower thrust member 120 may be installed so that an outer peripheral surface thereof is bonded to an inner peripheral surface of the coupling part 114.

Meanwhile, the lower thrust member 120 may include a disk part 122 and an extension part 124 extended from an outer edge of the disk part 122 upwardly in the axial direction and having an outer surface fixed to the base member 110. The disk part 122 may have the shaft 130 protruding upwardly in the axial direction in a central portion thereof.

That is, the lower thrust member 120 may have a cup shape. In other words, the lower thrust member 120 may have a '⊂' shaped cross section.

Meanwhile, the lower thrust member 120 according to another exemplary embodiment of the present disclosure may have a thrust bearing surface 121 positioned on an upper surface of the disk part 122 and forming a thrust bearing between the thrust bearing surface 121 and a lower surface of the sleeve 140. In addition, the thrust bearing surface may have inner and outer concave parts 123 and 125 depressed in one of inner and outer diameter directions thereof, respectively.

The inner concave part 123 may be formed at a boundary at which the shaft 130 protrudes from the lower thrust member 120, more specifically, the disk part 122. More specifically, as shown in FIG. 6, the inner concave part 123c may be formed in the lower thrust member 120, more specifically, the disk part 122, so as to be depressed in the downward axial direction. In addition, as shown in FIG. 7, the inner concave part 123d may also be formed in the shaft 130 so as to be depressed in the inner diameter direction.

In addition, the outer concave part 125 may be formed at a boundary at which the extension part 124 protrudes from the lower thrust member 120, more specifically, the disk part 122. More specifically, as shown in FIG. 6, the outer concave part 125c may be formed in the lower thrust member 120, more specifically, the disk part 122, so as to be depressed in the downward axial direction. In addition, as shown in FIG. 7, the outer concave part 125d may also be formed in the extension part 124 so as to be depressed in the outer diameter direction.

The spindle motor 100 according to another exemplary embodiment of the present disclosure may include the inner and outer concave parts 123 and 125, whereby boundary portions between the disk part 122 and the shaft 130 and between the disk part 122 and the extension part 124 may be depressed at the time of processing the lower thrust member 120.

Therefore, since protruding round parts that may be formed at the boundary portions between the disk part 122 and the shaft 130 and between the disk part 122 and the extension part 124 are not formed at the boundary portions, friction against the sleeve 140 fitted and rotated into a space formed by the disk part 122 and the extension part may not be generated. In addition, unnecessary separation between the upper surface of the disk part 122, that is, the thrust bearing surface 121 and the lower surface of the sleeve 140 due to the protruding round part may be not generated, such that a very efficient thrust bearing may be formed. Therefore, the spindle motor may be thinned and an axial distance may be sufficiently secured to increase bearing rigidity.

Meanwhile, the thrust bearing surface 121, the inner concave part 123, and the outer concave part 125 may be formed continuously in a circumferential direction. In this case, the lower thrust member 120 may easily exhibit performance thereof.

Meanwhile, since the lower thrust member 120 and the shaft 130 are formed integrally with each other in the spindle motor according to another exemplary embodiment of the present disclosure, an upper thrust member 160 provided at an upper end portion of the shaft 130 in order to assemble the spindle motor may be provided as a member separate from the shaft 130. The upper thrust member 160 may be provided as a separate member and may be coupled to the upper end portion of the shaft 130 in a fitting scheme.

Figure 8:
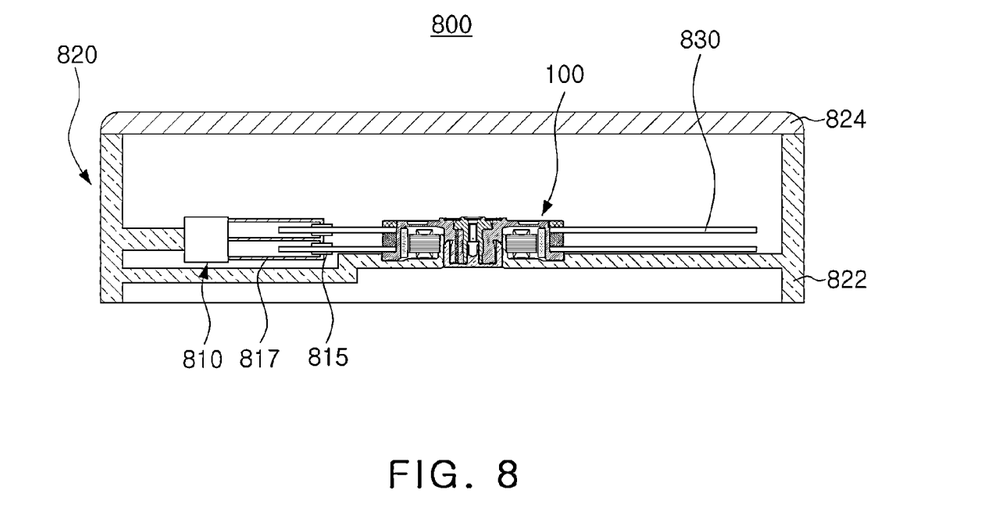
FIG. 8 is a schematic cross-sectional view showing a recording disk driving device having the spindle motor according to an exemplary embodiment of the present disclosure mounted therein.

FIG. 8 is a schematic cross-sectional view showing a recording disk driving device having the spindle motor according to an exemplary embodiment of the present disclosure mounted therein.

Referring to FIG. 8, a recording disk driving device 800 having the spindle motor 100 according to an exemplary embodiment of the present disclosure mounted therein may be a hard disk drive and include the spindle motor 100, a head transfer part 810, and a housing 820.

The spindle motor 100 may have all features of the spindle motor according to an exemplary embodiment of the present disclosure described above and have a recording disk 830 mounted thereon.

The head transfer part 810 may transfer a magnetic head 815 detecting information of the recording disk 830 mounted in the spindle motor 100 to a surface of the recording disk of which the information is to be detected.

Here, the magnetic head 815 may be disposed on a support part 817 of the head transfer part 810.

The housing 820 may include a motor mounting plate 822 and a top cover 824 shielding an upper portion of the motor mounting plate 822 in order to form an internal space accommodating the spindle motor 100 and the head transfer part 810 therein.

As set forth above, according to exemplary embodiments of the present disclosure, a fixed shaft-type spindle motor capable of being thinned by improving accuracy in coupling between a lower thrust member and a member to be coupled through a simple change of a structure of the lower thrust member may be provided.

In addition, a fixed shaft-type spindle motor having improved operational performance by including a lower thrust member that may be accurately coupled to a shaft to decrease the overall thickness of the spindle motor and increase a bearing span distance may be provided.

Further, a fixed shaft-type spindle motor in which a thrust bearing may be accurately formed may be provided.

Furthermore, since a contact between a sleeve and a lower thrust member except for a portion at which a thrust bearing is formed in a fixed shaft-type spindle motor may be blocked, friction current may be decreased.

While exemplary embodiments have been shown and described above, it will be apparent to those skilled in the art that modifications and variations could be made without departing from the spirit and scope of the present disclosure as defined by the appended claims.

What is claimed is:

1. A spindle motor comprising:
   a lower thrust member fixed to a base member;
   a shaft fixed to the lower thrust member;
   a sleeve disposed above the lower thrust member and installed so as to be rotatable with respect to the shaft; and
   a rotor hub coupled to the sleeve to be rotated together therewith,
   wherein the lower thrust member includes a fitting protrusion protruding upwardly in the axial direction and fitted into a fixing groove formed in a lower end of the shaft so as to be depressed upwardly in the axial direction, a thrust bearing surface forming a thrust bearing between the thrust bearing surface and a lower surface of the sleeve, and an extension part protruding from an outer edge of the lower thrust member in a radial direction upwardly in the axial direction to form a liquid-vapor interface between the extension part and an outer surface of the sleeve while enclosing the sleeve, and
   the thrust bearing surface has inner and outer concave parts depressed in one of inner and outer diameter directions thereof, respectively.

2. The spindle motor of claim 1, wherein the inner concave part is formed at a boundary at which the fitting protrusion protrudes from the lower thrust member.

3. The spindle motor of claim 2, wherein the inner concave part is formed in the lower thrust member so as to be depressed downwardly in the axial direction.

4. The spindle motor of claim 2, wherein the inner concave part is formed in the fitting protrusion so as to be depressed in the inner diameter direction.

5. The spindle motor of claim 1, wherein the outer concave part is formed at a boundary at which the extension part protrudes from the lower thrust member.

6. The spindle motor of claim 5, wherein the outer concave part is formed in the lower thrust member so as to be depressed downwardly in the axial direction.

7. The spindle motor of claim 5, wherein the outer concave part is formed in the extension part so as to be depressed in the outer diameter direction.

8. The spindle motor of claim 1, wherein the thrust bearing surface, the inner concave part, and the outer concave part are formed continuously in a circumferential direction.

9. A spindle motor comprising:
a lower thrust member fixed to a base member;
a shaft disposed in the lower thrust member;
a sleeve disposed above the lower thrust member and installed so as to be rotatable with respect to the shaft; and
a rotor hub coupled to the sleeve to be rotated together therewith,
wherein the lower thrust member is formed integrally with the shaft and includes a thrust bearing surface forming a thrust bearing between the thrust bearing surface and a lower surface of the sleeve and an extension part protruding from an outer edge of the lower thrust member in a radial direction upwardly in the axial direction to form a liquid-vapor interface between the extension part and an outer surface of the sleeve while enclosing the sleeve, and
the thrust bearing surface has inner and outer concave parts depressed in one of inner and outer diameter directions thereof, respectively.

10. The spindle motor of claim 9, wherein the inner concave part is formed at a boundary at which the shaft protrudes from the lower thrust member.

11. The spindle motor of claim 10, wherein the inner concave part is formed in the lower thrust member so as to be depressed downwardly in the axial direction.

12. The spindle motor of claim 10, wherein the inner concave part is formed in the shaft so as to be depressed in the inner diameter direction.

13. The spindle motor of claim 9, wherein the outer concave part is formed at a boundary at which the extension part protrudes from the lower thrust member.

14. The spindle motor of claim 13, wherein the outer concave part is formed in the lower thrust member so as to be depressed downwardly in the axial direction.

15. The spindle motor of claim 13, wherein the outer concave part is formed in the extension part so as to be depressed in the outer diameter direction.

16. The spindle motor of claim 9, wherein the thrust bearing surface, the inner concave part, and the outer concave part are formed continuously in a circumferential direction.

17. A hard disk drive comprising:
the spindle motor of claim 1 rotating a disk by power applied thereto through a substrate;
a magnetic head writing data to and reading data from data from the disk; and
a head transfer part moving the magnetic head to a predetermined position above the disk.

18. A hard disk drive comprising:
the spindle motor of claim 9 rotating a disk by power applied thereto through a substrate;
a magnetic head writing data to and reading data from data from the disk; and
a head transfer part moving the magnetic head to a predetermined position above the disk.

* * * * *